(12) United States Patent
Ockenfuss et al.

(10) Patent No.: US 7,133,197 B2
(45) Date of Patent: Nov. 7, 2006

(54) METAL-DIELECTRIC COATING FOR IMAGE SENSOR LIDS

(75) Inventors: Georg Ockenfuss, Santa Rosa, CA (US); Steven D. Oliver, Boise, ID (US)

(73) Assignee: JDS Uniphase Corporation, Milpitas, CA (US)

( * ) Notice: Subject to any disclaimer, the term of this patent is extended or adjusted under 35 U.S.C. 154(b) by 128 days.

(21) Appl. No.: 10/785,384

(22) Filed: Feb. 23, 2004

(65) Prior Publication Data

US 2005/0185267 A1 Aug. 25, 2005

(51) Int. Cl.
*F21V 9/04* (2006.01)
*F21V 9/06* (2006.01)
*G02B 5/08* (2006.01)
*G02B 5/20* (2006.01)

(52) U.S. Cl. ...................... 359/360; 359/359
(58) Field of Classification Search ............... 359/354, 359/360
See application file for complete search history.

(56) References Cited

U.S. PATENT DOCUMENTS

| 4,805,027 | A |   | 2/1989  | Sluyter ........................ 358/225 |
|-----------|---|---|---------|------------------------------------------|
| 4,822,144 | A |   | 4/1989  | Vriens ..................... 350/339 F   |
| 5,035,485 | A |   | 7/1991  | Kageyama ................... 350/164     |
| 5,179,468 | A |   | 1/1993  | Gasloli ........................ 359/359 |
| 5,337,191 | A |   | 8/1994  | Austin ......................... 359/885 |
| 5,413,864 | A |   | 5/1995  | Miyazaki et al. ............ 428/432     |
| 5,419,969 | A | * | 5/1995  | Miyazaki et al. ............ 428/426     |
| 5,510,173 | A | * | 4/1996  | Pass et al. ................... 428/216  |
| 5,591,529 | A | * | 1/1997  | Braatz et al. ................ 428/457   |
| 5,646,781 | A |   | 7/1997  | Johnson, Jr. ................. 359/589   |
| 5,648,653 | A |   | 7/1997  | Sakamoto et al. ........ 250/208.1       |
| 6,049,419 | A |   | 4/2000  | Wheatley et al. ........... 359/359      |
| 6,262,830 | B1|   | 7/2001  | Scalora ........................ 359/248 |
| 6,287,675 | B1| * | 9/2001  | Guiselin et al. ............. 428/213    |
| 6,340,529 | B1| * | 1/2002  | Ebisawa et al. ............. 428/432     |
| 6,362,484 | B1|   | 3/2002  | Beyne et al. ................ 250/374    |
| 6,390,972 | B1| * | 5/2002  | Speier et al. ................ 600/112   |
| 6,493,052 | B1|   | 12/2002 | Satake et al. ................ 349/114   |
| 2002/0125464 | A1| * | 9/2002 | Saito et al. .................. 252/587  |

OTHER PUBLICATIONS

"Launch of New Large-sized, Integral Molding Silver Alloy Target—Silver Alloy Featuring High Reflectivity, Strong adhesiveness and High Corrosion Resistance" Feb. 25, 2003, ULVAC, Inc. Vacuum Metallurgical Co., Ltd.

* cited by examiner

*Primary Examiner*—Drew A. Dunn
*Assistant Examiner*—Joshua L. Pritchett
(74) *Attorney, Agent, or Firm*—Allen, Dyer, Doppelt Milbrath & Gilchrist, P.A.

(57) ABSTRACT

An infrared filter includes an optical filter stack disposed on a first surface of a substrate, the optical filter stack includes a plurality of dielectric layers and a plurality of metal layers alternating with the dielectric layers. and a transmission-enhancing coating. The infrared filter obtains an average transmission greater than or equal to 75% between 400 nm and 600 nm.

23 Claims, 7 Drawing Sheets

METAL-DIELECTRIC COATING FOR IMAGE SENSOR LIDS

CROSS-REFERENCE TO RELATED APPLICATIONS

This patent application is being concurrently filed with U.S. patent application Ser. No. 10/785,589, entitled ANTI-ALIASING OPTICAL FILTER FOR IMAGE SENSORS, by Anthony D. McGettigan and Georg Ockenfuss, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to optical filters, and more particularly to thin film metal-dielectric infrared blocking filters.

BACKGROUND OF THE INVENTION

Color imaging devices, such as digital cameras, camera phones, and color copiers, use photodetector arrays to produce electronic signals that are capable of producing color images on a display or in a printer. A typical photodetector array has many individual photosites, each of which is responsive over a relatively wide range of wavelengths. For example, a photodetector produces an electrical signal whether it is illuminated with red, blue, green or infrared (IR) light. The magnitude of the electrical signal produced at different wavelengths of light varies according to the wavelength response of the photodetector. To form a color image, color pass filters are placed over individual photodetectors so that each photodetector is responsive to a relatively narrow range of light. For example, blue (pass) dye is placed over a photodetector in a detector array to obtain a blue detector. Similarly, red and green dye is placed on other photodetectors to obtain red and green detectors (generally "color detectors"). The diode array thus obtains spatial color data when imaging an object.

Unfortunately, the dyes used to obtain the color detectors do not filter out IR light very well. IR light illuminating the color detectors increases the noise level out of the color detectors. In other words, a color detector that is not being illuminated by light of its selected color will still produce an electrical signal if it is illuminated with IR light. IR illumination of color detectors can reduce the brightness of ("washout") the colors and the contrast of the image because regions that appear dark to the observer's eye will appear lighter in the image if IR light is illuminating the photodetector.

Many techniques have been used to reduce the amount of IR illuminating color detector arrays. In digital imaging systems, such as digital still cameras ("DSCs"), video cameras, and camera-telephones ("camphones"), lids have been placed over the color detector array. The original function of the lid was to protect the sensor from dust particles. To save space in compact digital imaging devices, such as a camphone, IR filters have been used as a lid. As used herein, the terms "IR filter" and "IR-blocking filter" mean a filter that absorbs or reflects (filters out) IR light and generally transmits visible light.

One type of lid uses colored glass ("color glass") that absorbs IR light (IR-blocking glass). Color glass is usually not used in camphones because of its thickness. Another type of lid uses an IR-blocking filter made of a series of layers of dielectric materials. Other lids use an IR-blocking filter on a colored glass substrate. In DSCs, IR-blocking and blur filters (also called an optical low-pass filter ("OLPF")) are combined and are physically separated from the sensor and sensor lid However, IR-blocking color glass lids are relatively thick (typically about 0.5 to 1.2 mm thick), which makes this approach undesirable for use in small, portable devices such as cell phones and digital cameras. IR-blocking color glass is also relatively expensive, and the amount of IR-blocking color glass depends on both the color density and thickness of the IR-blocking color glass.

Dielectric IR-blocking filters typically have 30–50 quarter-wave layers of dielectric materials coated on a plain glass substrate that is about 0.3 mm thick. The total dielectric stack height (i.e. all 30–50 layers) is typically about 3–5 microns. However, coating this many layers, typically in a vacuum deposition system, takes a long time and is therefore relatively expensive.

A stack this thick on such a thin substrate also can bend the substrate out-of-plane. Another problem arises from the wavelength shift with angle of incidence. In a typical dielectric IR-blocking filter the wavelength (e.g. cutoff wavelength) shifts 25 nano-meters ("nm") with a 25-degree change in the angle of incidence from normal.

Wavelength shift can be reduced by using dielectric layers with higher refractive indices, but this generally requires more layers to be coated to achieve the same filter characteristic. Some wavelength shift can be corrected in the imaging device, but these techniques can be cumbersome and difficult to achieve, particularly in shallow (short light path length) optical assemblies, such as are found in camera phones and similar devices.

Furthermore, due to the high layer count and the thin substrate, dense, high-quality dielectric thin-film coating bends the substrate due to compressive stress and can cause yield loss in post coating processes, such as dicing the deposition substrate into filters. Because of the problems arising from dielectric thin-film IR-blocking filters, some users have abandoned this approach and have returned to using IR-blocking glass. However, color glass has issues with environmental stability and batch-to-batch variation.

Similarly, almost all the charge-coupled diode ("CCD") and complementary metal-oxide-semiconductor ("CMOS") image sensors have not only color dyes coated over the photodetectors, but also polymer microlenses. It is difficult to coat anything directly on top of the microlenses, especially when a high-temperature process is used. Therefore, it is desirable to provide an IR-blocking device for color detector arrays that avoids the problems mentioned above.

BRIEF SUMMARY OF THE INVENTION

The present invention provides an infrared filter with an average transmission of at least 75% between 400 nm and 600 nm. Embodiments include an optical filter stack disposed on a first surface of a substrate and a transmission-enhancing coating disposed on the second surface of the substrate. The optical filter stack includes a plurality of dielectric layers and a plurality of metal layers that alternate with the dielectric layers. In one embodiment, a nine-layer metal-dielectric IR filter had five dielectric layers and four metal layers.

Forming the IR filter on a substrate, rather than directly on a photodetector array, allows high-temperature annealing of the IR filter to improve transmission. In some embodiments, very thin, typically 1–3 nm, corrosion-suppressing layers are included between the silver layers and dielectric layers to improve transmission through the filter in the visible portion of the spectrum.

DETAILED DESCRIPTION OF EMBODIMENTS

1. Exemplary IR Filters

Figure 1A:
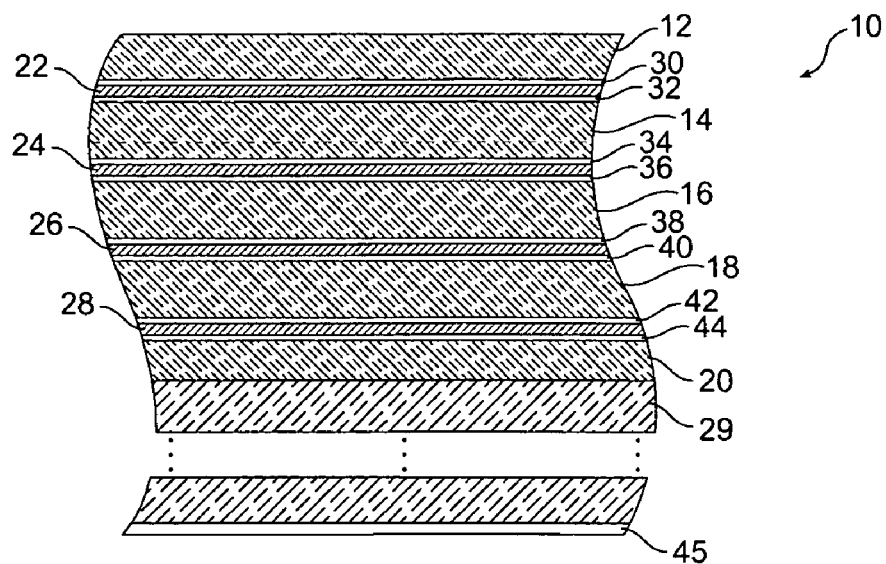
FIG. 1A is a simplified cross section of an IR blocking filter according to an embodiment of the present invention.

FIG. 1A is a simplified cross section of an IR filter 10 according to an embodiment of the present invention. The IR filter 10 includes layers of dielectric material 12, 14, 16, 18, 20 alternating with layers of thin, semi-transparent metal layers("optical metal layers"), such as silver or silver alloy 22, 24, 26, 28 in what is commonly known as an "optical design". The silver layers are typically about 9–25 nm thick, and are fairly transparent in the visible spectrum. The layer thicknesses are not drawn to scale, and the thicknesses are exaggerated for purposes of illustration.

The optical design is deposited on an optical substrate 29, such as a glass plate or sheet, using a variety of deposition techniques, such as evaporation, plasma-assisted evaporation, reactive-ion evaporation, sputtering, reactive sputtering, ion-beam deposition, chemical vapor deposition, and plasma-enhanced chemical vapor deposition. The optical substrate generally has high transmission of the desired (e.g. visible) wavelengths of light. Different layers may be deposited using different techniques. For example, the metal layers could be sputtered while the dielectric layers are formed using a metal sputtering target in an oxygen-containing environment. In a particular embodiment, the substrate is a clear glass substrate about 0.3 mm thick, which is suitably rigid to avoid bending from stresses created by the metal-dielectric optical stack, and sufficiently thin to allow a short (shallow) optical path in a color photodetector assembly, and to obtain a light-weight filter. The total film thickness is very small, and the bending moment due to stress is small, so even thinner substrates are used in other embodiments.

In an alternative embodiment, the first layer (i.e. the first layer that is deposited on the substrate) is a silver layer. For example, referring to FIG. 1A, dielectric layer 20 is omitted and metal layer 28 is deposited on the substrate 29, typically without, but alternatively with, an intervening corrosion suppression layer 44. Good spectral performance is obtained, and coating time is reduced compared to the embodiment shown in FIG. 1A.

Optional layers of corrosion-suppressing material ("corrosion-suppressing layers" or "barrier layers") 30, 32, 34, 36, 38, 40, 42, 44 are deposited between the silver layers and the dielectric layers. The corrosion-suppressing layers are very thin, and in typical embodiments are formed by depositing a layer less than 1 nm thick of Nb, Ti, or Zn, for example, and subsequently oxidizing the very thin metal layer.

Alternatively, the corrosion-suppressing layers are deposited as oxidized metal layers generally less than about 10 nm thick, and in a particular embodiment, a very thin ($\leq 1$ nm) metal layer is first deposited on a silver layer, and metal oxide is then deposited on the very thin metal layer to form the corrosion-suppressing layer. The very thin metal layer is at least partially oxidized in situ in some embodiments. Depositing the very thin metal layer on the silver layer is believed to prevent unwanted oxidation of the silver layer that might otherwise occur during deposition of a corrosion-suppressing metal oxide. While the very thin corrosion-suppressing layers are not believed to substantially contribute as optical layers, they can improve the performance of the IR blocking filter, presumably because of reducing corrosion in the metal optical layers, as discussed below. Suitable dielectric materials include $Nb_2O_5$, $TiO_2$, $Si_3N_4$, $Ta_2O_5$, $ZrO_2$, $Y_2O_3$, $CeO_2$, $Al_2O_3$, $ZnO$, $SiO_2$ and their mixtures. An optional AR coating 45 is added to the backside of the substrate 29 to improve transmission through the IR filter 10.

In particular embodiments, Ag is used because of its low refractive index (n) in the visible spectrum. Silver alloy containing about 0.5 wt % Au and about 0.5 wt % Sn, with trace amounts (less than 5 ppm) Cu, Pd, Pb, and Fe, the remaining 99 wt % being Ag, is used in particular embodiments because of its low extinction coefficient and relatively good (compared to pure silver) corrosion resistance.

A particular embodiment had the following optical design:

29.0 nm $Nb_2O_5$
14.5 nm Ag
58.0 nm $Nb_2O_5$
16.6 nm Ag
58.0 nm $Nb_2O_5$
17.0 nm Ag
58.0 nm $Nb_2O_5$
20.5 nm Ag
29.0 nm $Nb_2O_5$ deposited on a 0.3 mm thick clear glass substrate. Additionally, 8 layers of ZnO were formed. The four ZnO layers deposited underneath the corresponding silver layers were coated as ZnO. The four ZnO layers deposited on top of the corresponding silver layers were started as metallic Zn (<1 nm), which was then at least partially oxidized in situ and overcoated with a small amount of ZnO, thus avoiding exposing the top of the silver layer to the oxygen plasma used in depositing the ZnO. The total thickness of the Zn—ZnO layers is about 2 nm. Corrosion suppression layers of ZnO are preferably between about 1–10 nm thick. A thinner layer does not provide adequate corrosion suppression, and a thicker layer absorbs an undesirable amount of light. The total thickness of the ZnO is estimated to be about 16.0 nm, the total thickness of the silver layers is about 68.7 nm, and the total thickness of the $Nb_2O_5$ layers is about 212.7 nm, for a total stack thickness of about 297.5 nm. The thicknesses shown in FIG. 1A are not to scale.

Optical designs having the general structure (0.5H-xM-0.5H) were evaluated, where 0.5H is a quarter-wave optical thickness at 550 nm of dielectric layer, and xM is a silver layer wherein x is a thickness of the silver layer between about 9 nm and about 25 nm. It was found that optical designs with three silver layers had a relatively shallow transition from the passband to the blocked wavelengths, but higher transmission in the passband. Optical designs with 6 silver layers provided a steep transition, but lower transmission in the passband. Optical designs having 4–5 silver layers were found to provide both good transmission in the passband, and a sufficiently steep transition, and thus are particularly desirable.

Figure 1B:
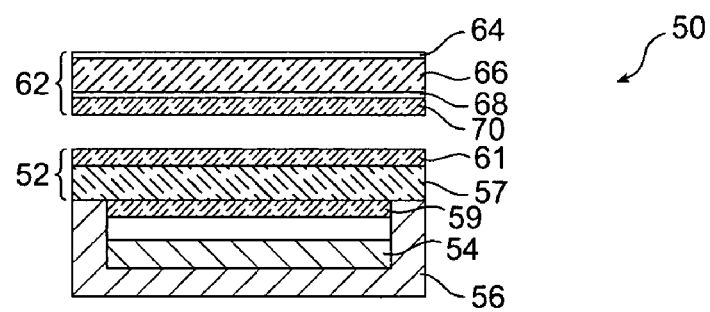
FIG. 1B is a simplified cross section of a photodetector assembly according to an embodiment of the present invention.

FIG. 1B is a simplified cross section of a photodetector assembly 50 according to an embodiment of the present invention. A lid 52 seals a photodetector array 54 inside a package 56. The photodetector array is a color photodetector array, or alternatively a black-and-white photodetector array. The lid 52 includes a cover glass 57 with antireflective ("AR") coatings 59, 61 on both sides of the cover glass 57.

An IR filter 62 includes a metal-dielectric IR filter 64 on a glass substrate 66. An optional blur filter 68 is formed on the opposite side of the glass substrate 66, and an AR coating 70 is formed over the blur filter 68. Alternatively, a substrate that functions as a blur filter is used. If the blur filter 68 is omitted, the AR coating is formed on this side ("backside") of the glass substrate 66. The blur filter slightly blurs the image to avoid high frequency artifacts, such as aliasing and Moire patterns. Blur filters are typically layers of birefringent material, such as quartz crystal, but alternatively are layers of polymer, such as liquid photopolymerizable polymer ("LPP") with overlying liquid crystal polymer ("LCP"). LPP/LCP blur filters are thinner, lighter, less prone to breakage, and less expensive than blur filters made from quartz crystal. In an alternative embodiment, the glass substrate 66 is replaced with a birefringent material, such as single-crystal quartz.

Figure 1C:
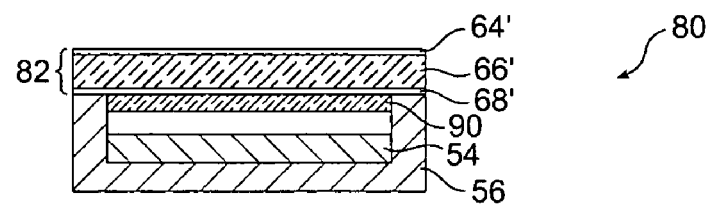
FIG. 1C is a simplified cross section of a photodetector assembly according to another embodiment of the present invention.

FIG. 1C is a simplified cross section of a photodetector assembly 80 according to another embodiment of the present invention. A lid 82 seals the photodetector array 54 in the package 56. The lid 82 includes a metal-dielectric IR-blocking filter 64' on a glass substrate 66'. An optional blur filter 68' and AR coating 90 are formed on the side of the glass substrate 86 opposite the metal-dielectric IR-blocking filter 64'. This embodiment is particularly desirable because of the short optical path provided by the photodetector assembly. It is further desirable for use with photodetector arrays having microlenses, which are difficult to coat thin-films over and are typically made of a polymer, which limits the temperature to which the lensed photodetector array can be heated, and may cause problems during deposition, such as outgassing. Similarly, smoothing the dye and/or microlenses with a polymer layer also typically limits the temperature to which the smoothed photodetector array can be heated.

Figure 2A:
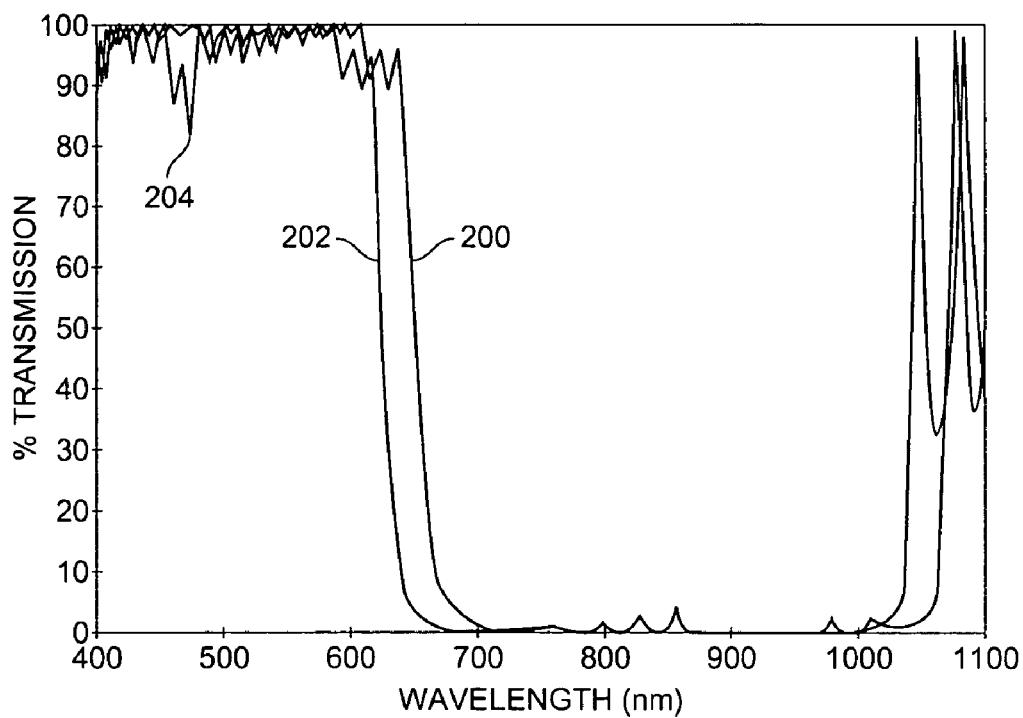
FIG. 2A shows plots of the expected transmission versus wavelength for a modeled conventional dielectric IR-blocking filter design illustrating expected angle shift.

FIG. 2A shows plots of the expected transmission versus wavelength for a modeled conventional dielectric IR-blocking filter design illustrating expected angle shift. The plots were generated by computer-executed optical filter modeling software, such as OPTILAYER, available from Gary deBell of Los Altos, Calif., and TF CALC from SOFTWARE SPECTRA, INC., of Portland, Oreg. The dielectric IR-blocking filter design includes alternating layers of $SiO_2$/$Nb_2O_5$ for a total of 34 layers on a glass substrate. The 34-layer dielectric stack is over 3.5 microns thick. A first plot 200 shows the transmission at a normal (0 degree) angle of incidence. A second plot 202 shows the transmission at a 25-degree angle of incidence. The second plot shifts about 25 nm down spectrum. Additionally, a half-wave hole 204 appears at non-normal angles of incidence. This half-wave hole changes in both center wavelength and depth with varying angles of incidence.

Figure 2B:
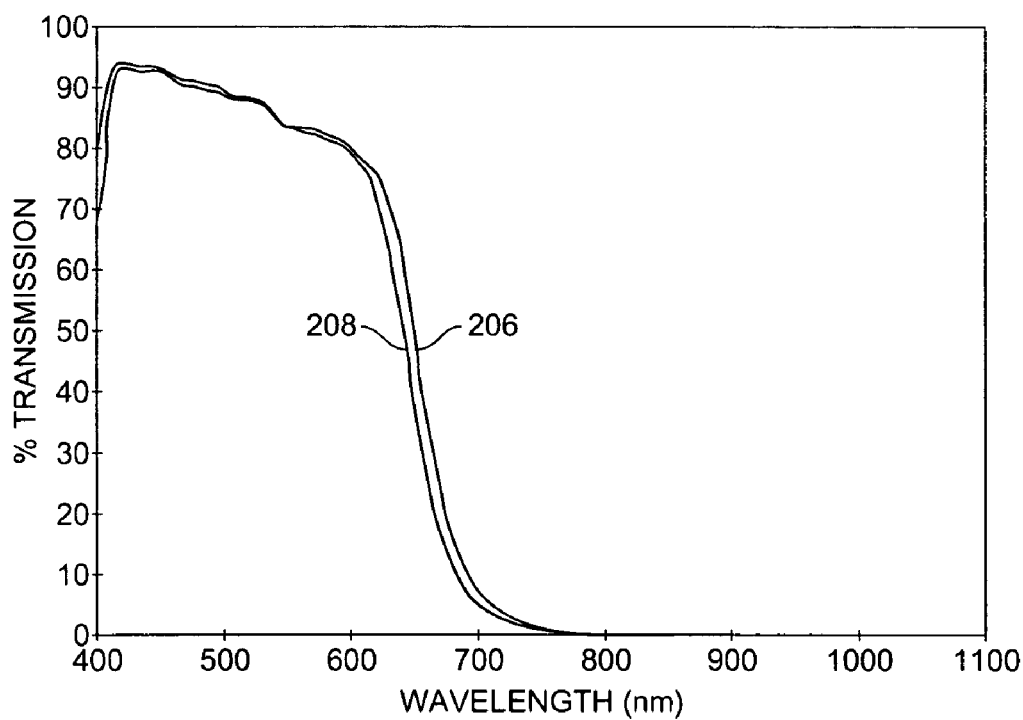
FIG. 2B shows plots of the expected transmission versus wavelength for a modeled IR-filter design according to an embodiment of the present invention illustrating expected angle shift.

FIG. 2B shows plots of the expected transmission versus wavelength for a modeled metal-dielectric IR filter design according to an embodiment of the present invention illustrating expected angle shift. The metal-dielectric IR filter design includes alternating layers of $TiO_2$/Ag for a total of 9 layers (5 layers of $TiO_2$ and 4 layers of Ag) on a glass substrate. The 9-layer metal-dielectric stack is about 0.3 microns thick. A first plot 206 shows the transmission at a normal (0 degree) angle of incidence. A second plot 208 shows the transmission at a 25-degree angle of incidence. The second plot shifts about 8.5 nm down spectrum. Additionally, no discernable half-wave hole appears at non-normal angles of incidence.

Figure 2C:
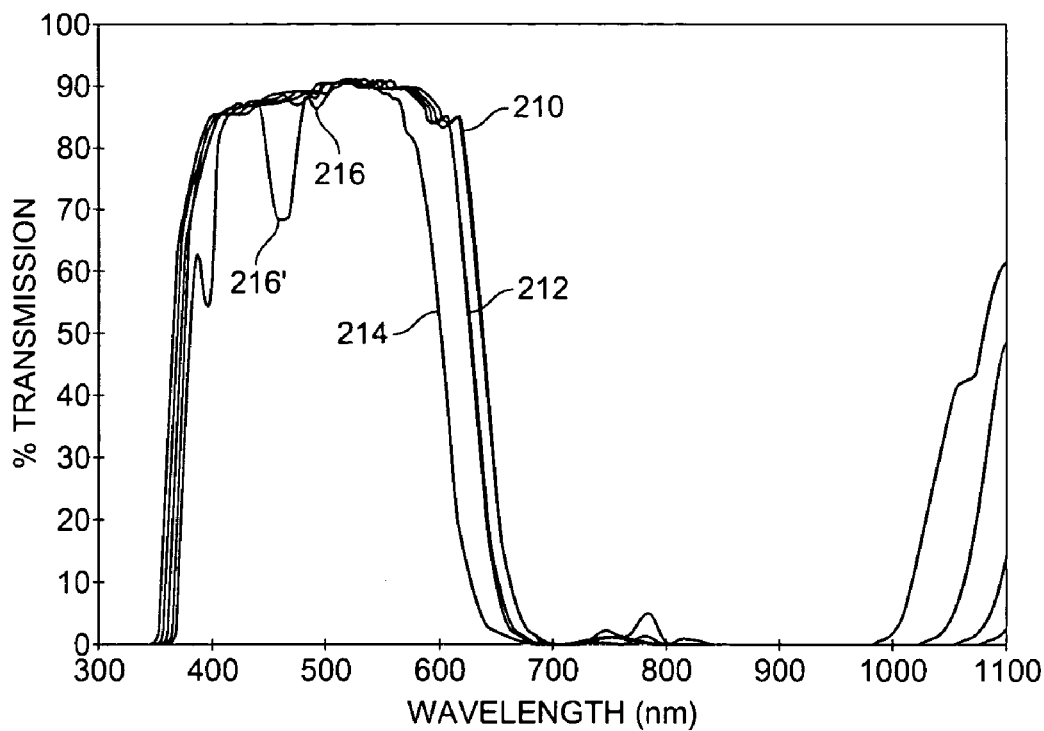
FIG. 2C shows the measured angle shift for a conventional dielectric IR-blocking filter.

FIG. 2C shows plots of the measured angle shift for a conventional dielectric thin-film IR-blocking filter. A first plot 210 shows transmission at normal incidence. A second plot 212 shows transmission at 20 degrees incidence, and a third plot 214 shows transmission at 40 degrees incidence. The half-wave hole 216 evident at 20 degrees incidence shifts down-spectrum and deepens into the half-wave hole 216' at 40 degrees incidence. The down-spectrum shift was about 39.5 nm at 40 degrees incidence.

Figure 2D:
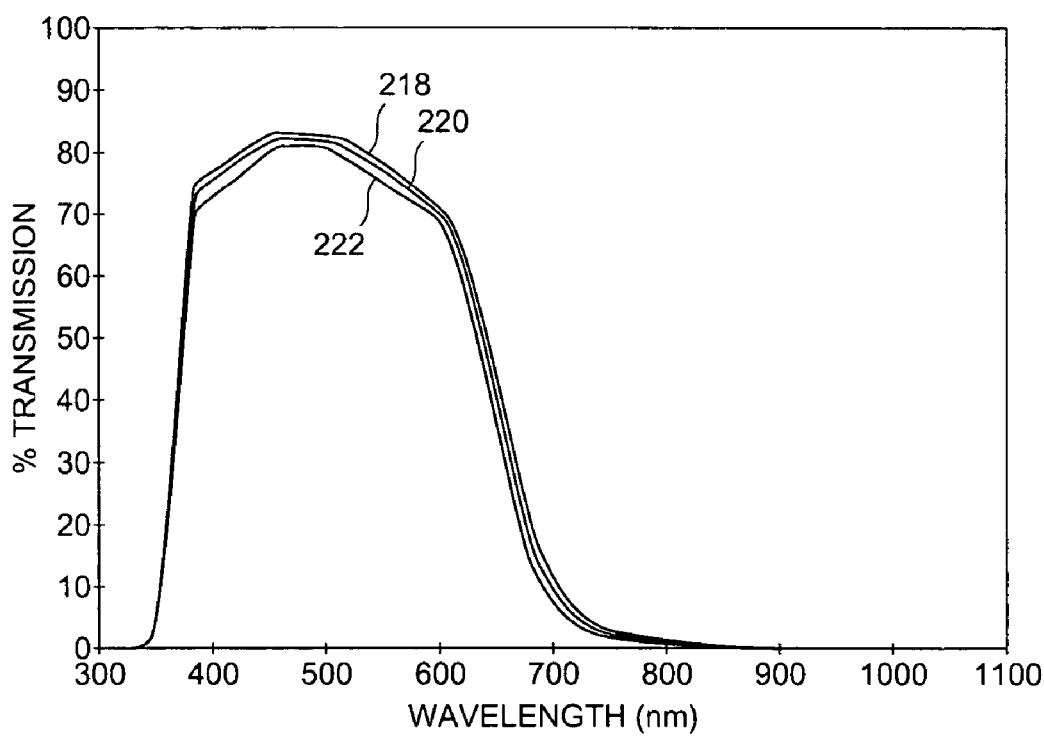
FIG. 2D shows the measured angle shift for a IR-filter fabricated in accordance with an embodiment of the present invention.

FIG. 2D shows plots of the measured angle shift for a metal-dielectric IR filter fabricated in accordance with an embodiment of the present invention. A first plot 218 shows transmission at normal incidence. A second plot 220 shows transmission at 20 degrees incidence, and a third plot 222 shows transmission at 40 degrees incidence. The down-spectrum shift was about 12.0 nm at a 40-degree angle of incidence.

Figure 3A:
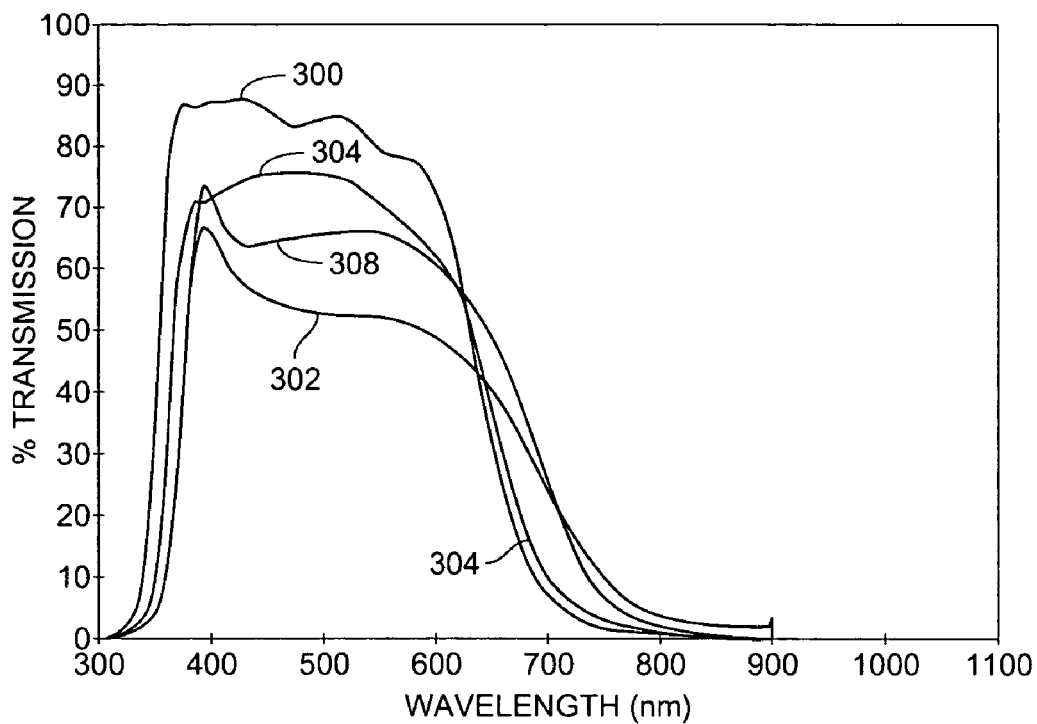
FIG. 3A shows plots of measured transmission versus wavelength for various metal-dielectric filter designs fabricated according to embodiments of the present invention.

FIG. 3A shows plots of measured transmission versus wavelength for various metal-dielectric filter designs fabricated according to embodiments of the present invention. All samples were 9-layer designs, with five dielectric layers and 4 silver layers. All silver layers were Ag-0.5 wt % Au-0.5 wt % Sn ("Ag alloy"), and were about 12–22 nm thick. A first plot 300 is the theoretical transmission for a metal-dielectric filter using $Nb_2O_5$ as the dielectric material and using the theoretical dispersion from Nestle-Cristal ("NC") for Ag. The theoretical transmission without an AR coating averages 82% between 400 nm and 600 nm.

A second plot 302 is the measured transmission for a metal-dielectric filter using $Nb_2O_5$ and Ag alloy in the optical stack. The actual transmission is surprisingly less than the theoretical transmission, only averaging 53% between 400 nm and 600 nm. In a particular embodiment, it is desirable to obtain an average transmission greater than or equal to 80% between 400 nm and 600 nm (generally the visible portion of the spectrum) to obtain a good signal-to-noise ratio from the photodetector array. Additionally, an average transmission in this range is similar to the IR blocking achieved by color glass, thus allowing replacement of color glass lids with metal-dielectric filters in some applications.

Some embodiments of the invention have features that were found to improve the transmission performance of metal-dielectric filters. Various theories were developed and tested. One theory was that the interface between the silver and the dielectric material was affecting transmission. It was also thought that providing a barrier to oxygen diffusion into the silver layers might improve transmission. Various non-optical (i.e. not part of the interference stack) layers were evaluated between the Ag and dielectric layers, and various types of dielectric materials were evaluated.

A third plot 304 is the measured transmission for a metal-dielectric filter using $Nb_2O_5$ and Ag alloy in the optical stack with intervening layers of Zn oxidized in situ to form layers of ZnO between the Ag alloy and $Nb_2O_5$ layers. The ZnO layers were added to suppress oxidization of the Ag alloy layers and were suitably thin to avoid contributing to the interference structure of the optical stack.

This metal-dielectric filter obtained an average reflectivity of 72% between 400 nm and 600 nm. It is believed that the ZnO sealed the silver layers and provided a superior layer to deposit $Nb_2O_5$ on, and reduced oxidation of the silver in the optical layer(s) from oxygen present during the deposition of the dielectric layers. In other words, although the dielectric layers protect the silver layers from environmental corrosion after deposition, the deposition environment and as-deposited dielectric layers can adversely affect the silver layers, and degrade the transmission of visible light of the IR filter.

The latter belief is based on other tests that varied the surface roughness of the sliver layers by changing deposition conditions. Silver layers in metal-dielectric structures using $Nb_2O_5$ were sputtered in an Ar atmosphere at flow rates of 200 sccm, 130 sccm, and 70 sccm. The flow rates are exemplary and relevant only to a particular deposition system, and are provided solely for comparative purposes. Atomic force microscopy was used to evaluate the surface smoothness, and smoother Ag surfaces were produced over $Nb_2O_5$ at lower flow rates. The smoothest Ag surface was obtained at a flow rate of 70 sccm. It is believed that there is greater diffusion of oxygen into the silver when the $Nb_2O_5$, which was reactively sputtered from an Nb target in an oxygen-containing environment, was deposited, and that the oxygen diffusion degrades the optical performance of the silver layer. The rough surface provides a larger interface area, which is believed to create a higher probability of oxygen diffusion and the rough surface is also more difficult to cover.

A fourth plot 308 shows the transmission for a metal-dielectric filter using $Nb_2O_5$ as the dielectric, and thin (less than 1 nm) layers of Nb metal as barrier layers. To obtain these layers, the oxygen flow to the deposition chamber was shut off immediately before and after depositing the $Nb_2O_5$. The average transmission between 400 nm and 600 nm was 64.5%. It is believed that the higher galvanic potential of the Zn provides superior corrosion suppression in the silver layers than Nb.

Figure 3B:
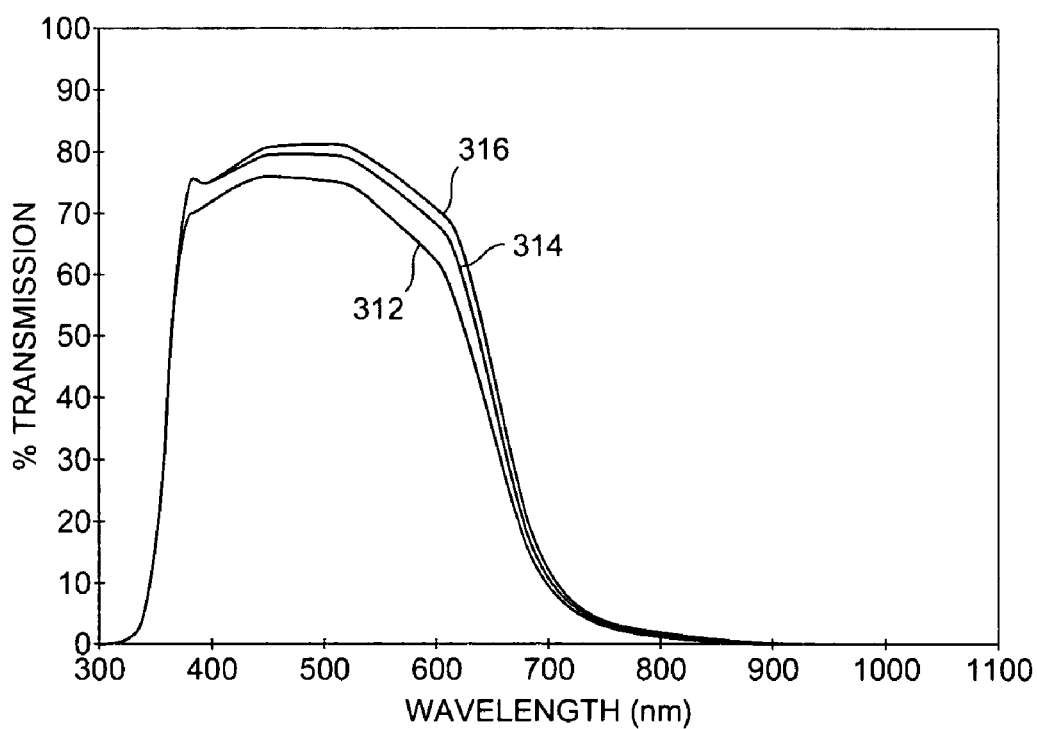
FIG. 3B shows plots of measured transmission versus wavelength for a metal-dielectric filter design according to an embodiment of the present invention annealed under different conditions.

FIG. 3B shows plots of measured transmission versus wavelength for a metal-dielectric filter design according to an embodiment of the present invention annealed under different conditions. It was also thought that annealing may affect the optical performance of optical filters, particularly with designs using barrier metal layers having a higher galvanic potential than silver, such as Zn.

Metal-dielectric filters were fabricated in accordance with the $Nb_2O_5$—ZnO—Ag filter represented by plot 304 in FIG. 3A. A first plot 312 shows the transmission of the filter without anneal. This filter had an average transmission of 72%, which is consistent with plot 304 in FIG. 3A. A second plot 314 shows the transmission of a filter after annealing at 200° C. for two hours in air. This filter had an average transmission of 76%. A third plot 316 shows the transmission of a filter after annealing at 300° C. for two hours in air. This filter had an average transmission of 78%. Thus, most of the benefit of annealing is obtained after a two-hour anneal at 200° C. Some dendritic defects were observed under 500× microscopic power for the sample annealed for two hours at 300° C.; thus, baking this filter for this period in this atmosphere at this temperature may be undesirable for some applications. It is believed that the optimum annealing temperature is between 220° C. and 300° C. Exposing conventional color photodetector arrays using color dyes are not suitable for exposure to such high temperatures. Thus, in some embodiments, particularly embodiments where annealing is done, it is desirable to form the IR filter on a separate substrate, and not directly on a photodetector array. Polymer microlenses can similarly limit temperature exposure, for both color and black-and-white photodetector arrays.

Figure 3C:
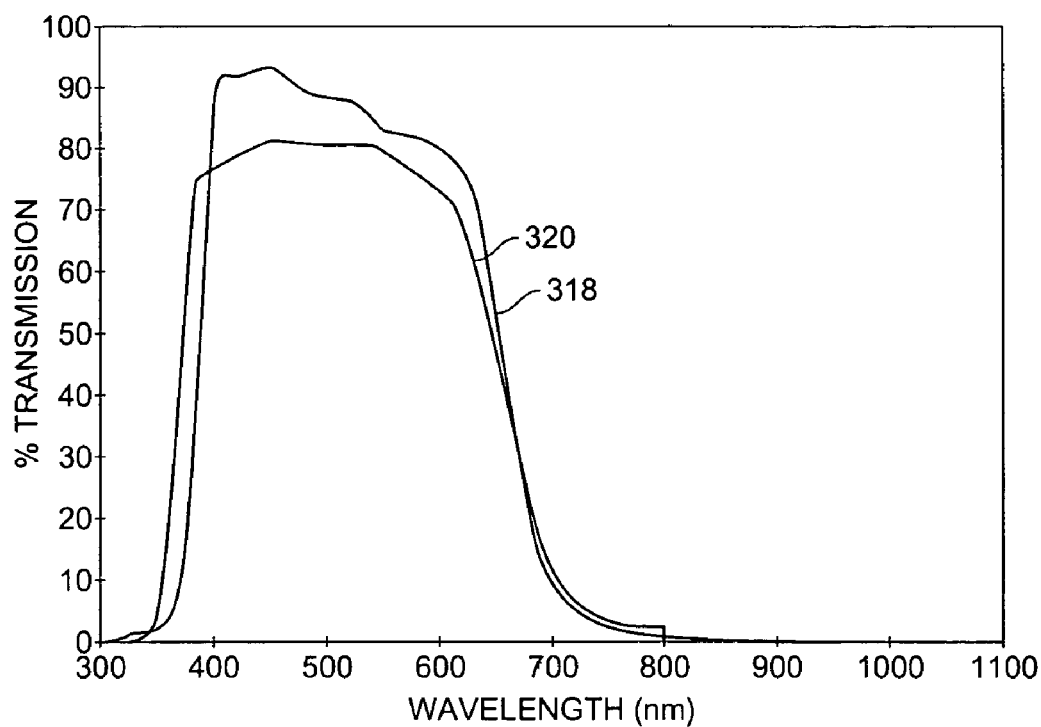
FIG. 3C shows plots of measured transmission versus wavelength for metal-dielectric filter designs according to embodiments of the present invention, compared with a theoretical plot, illustrating the effect of an anti-reflective coating on the backside of the substrate.

FIG. 3C shows plots of measured transmission versus wavelength for metal-dielectric filter designs according to embodiments of the present invention, compared with a theoretical plot, illustrating the effect of an anti-reflective coating on the backside of the substrate. A first plot 318 shows the predicted transmission for a 9-layer $Nb_2O_5$/Ag alloy filter with an AR coating on the opposite side of a glass substrate. This design has an average transmission of 87% between 400 nm and 600 nm. A second plot 320 shows the measured transmission for a filter fabricated in accordance with the 9-layer design represented by plot 318 with ZnO barrier layers between the $Nb_2O_5$ and Ag alloy layers. This filter had an average transmission of 80% between 400 nm and 600 nm.

Figure 4:
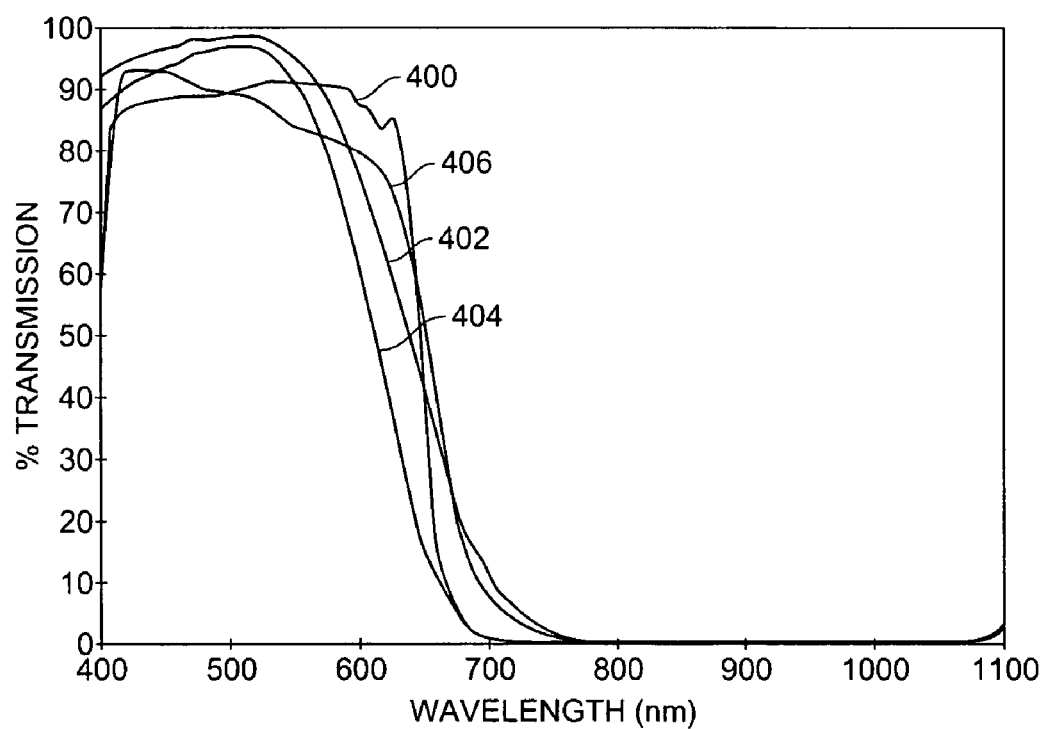
FIG. 4 shows plots of transmission versus wavelength for prior art IR filters compared to a metal-dielectric filter according to an embodiment of the present invention.

FIG. 4 shows plots of transmission versus wavelength for prior art IR filters compared to a metal-dielectric filter according to an embodiment of the present invention. A first plot 400 shows the transmission of an all-dielectric 37-layer IR-blocking filter on a 0.3 mm glass substrate. A second plot 402 shows the transmission of color glass 0.5 mm thick, in this case BG-39™, a trademark of SCHOTT, represented in the United States of America by SCHOTT NORTH AMERICA, INC., of Elmsford, N.Y. A third plot 404 shows the transmission of 1.0 mm thick BG-39™ glass. A fourth plot 406 shows the transmission of a 9-layer metal-dielectric filter made in accordance with FIG. 1A, using $Nb_2O_5$ as the dielectric material and Ag alloy as the optical metal material. Barrier layers of ZnO were included between the dielectric and optical metal layers. An AR coating was deposited on the backside of a 0.3 mm clear glass substrate.

The excellent performance of the metal-dielectric filter was obtained using a variety of Ag alloy coating parameters. A low (70 sccm) flow of Ar into the sputtering chamber was used in conjunction with 1.6 kW of power at a base pressure less than $8 \times 10^{-7}$ Torr at a chamber temperature of 50° C. The deposition rate was a relatively fast 17 Angstroms/second, which results in low contamination of the silver and improved optical performance.

Figure 5:
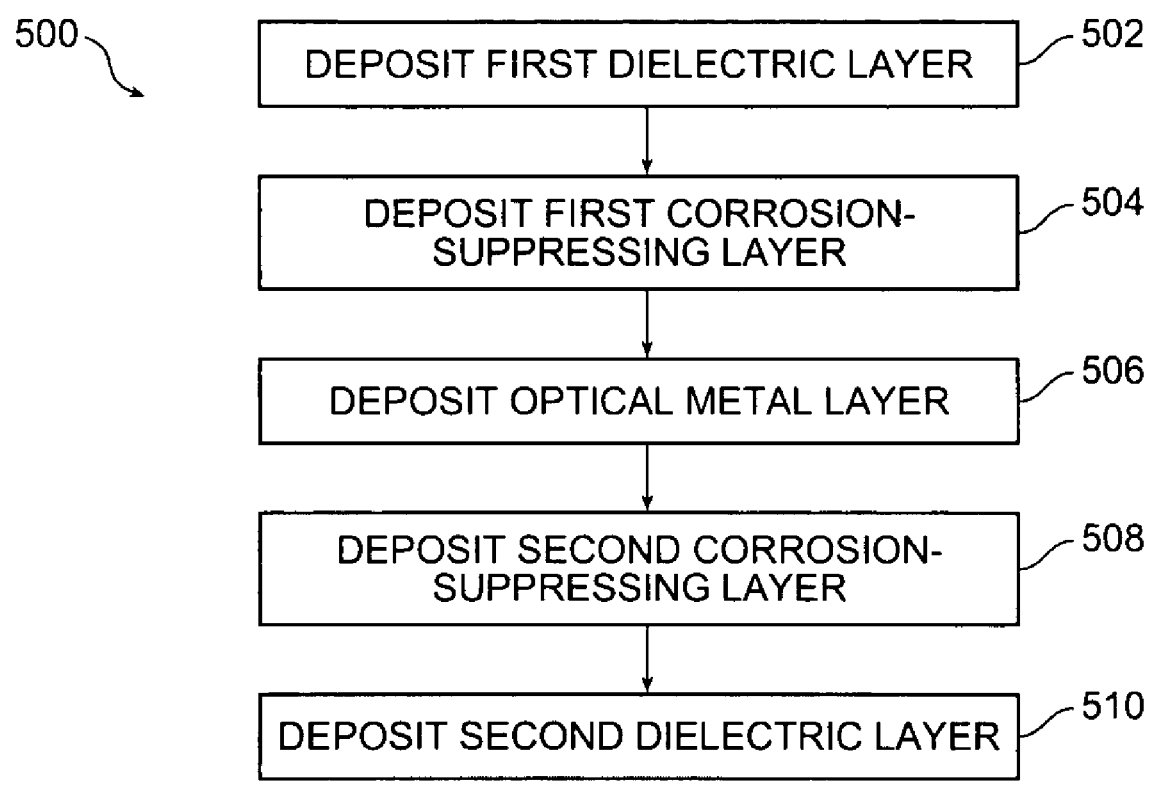
FIG. 5 is a simplified flow chart of a method of fabricating an optical filter on an optical substrate.

FIG. 5 is a simplified flow chart of a method of fabricating an optical filter on an optical substrate 500. The optical substrate is generally transmissive in the wavelengths of interest, and is plain glass, colored glass, birefringent glass, or quartz, for example. A first dielectric layer is deposited on the optical substrate (step 502). A corrosion-suppressing layer, such as a layer of niobia, titania, or zinc oxide, is deposited on the first dielectric layer (step 504). A metal layer, such as a layer of silver or silver alloy, is deposited on the corrosion-suppressing layer (step 506) and a second corrosion-suppressing layer is deposited on the metal layer (step 508). A second dielectric layer is deposited on the second corrosion-suppressing layer (step 510).

The thicknesses of the dielectric and metal layers are chosen to obtain the desired filter characteristics. In some embodiments, additional dielectric layers, metal layers, and corrosion-suppressing layers are deposited. For example, embodiments include five-dielectric, four-metal layer and four-dielectric, four-metal layer designs. The last (top) layer is usually a dielectric layer that provides environmental protection (e.g. protection from moisture) to the underlying metal (e.g. silver) layer.

In a particular embodiment, the second corrosion-suppressing layer is deposited in two portions, a metal portion and an oxide portion. The metal portion is very thin, typically less than about 1 nm, and is deposited first to protect the underlying metal (e.g. silver) layer from oxygen in the deposition chamber. This very thin metal portion of the corrosion-suppressing layer is optionally oxidized, or at least partially oxidized. Metal oxide, typically using the same metal as in the very thin metal portion, is then deposited for the remainder of the corrosion-suppressing layer.

Figure 6:
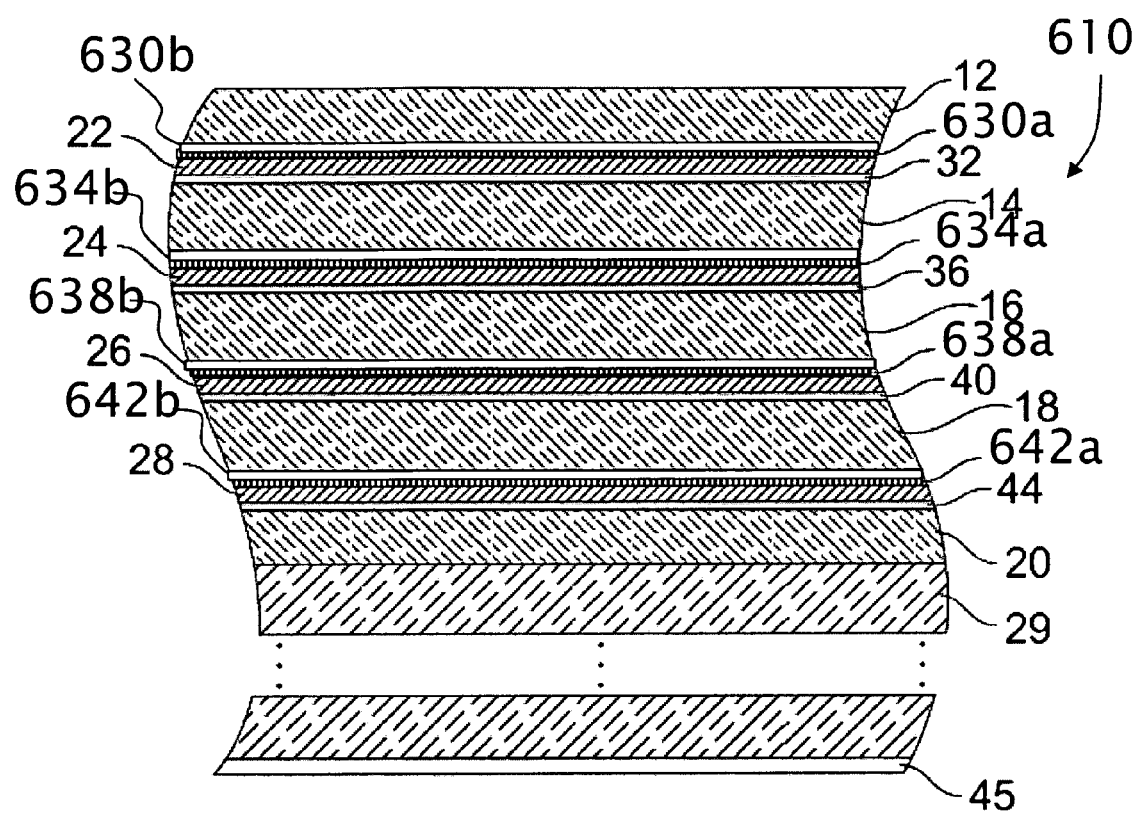
FIG. 6 is a simplified cross section of an IR blocking filter according to an embodiment of the present invention wherein the second corrosion suppressing layer is deposited in two portions.

FIG. 6 is a simplified cross section of an IR blocking filter according to an embodiment of the present invention wherein the second corrosion suppressing layer is deposited in two portions. The IR filter 610 is similar to the IR filter 10 discussed with reference to FIG. 1A, with the exception that the corrosion suppressing layers 30, 34, 38, and 42 are shown to include the two portions, namely, a metal portion and a metal oxide portion. More specifically, corrosion suppressing layer 30 has been replaced with a metal portion 630a and an oxide portion 630b, corrosion suppressing layer 34 has been replaced with a metal portion 634a and an oxide portion 634b, corrosion suppressing layer 38 has been replaced with a metal portion 638a and an oxide portion 638b, and corrosion suppressing layer 42 has been replaced with a metal portion 642a and an oxide portion 642b.

In an alternative embodiment, the first layer deposited on the substrate is a metal (e.g. silver) layer. A corrosion-suppressing layer is typically not required between the optical substrate and this silver layer; however, a corrosion-suppressing layer is desirable over this metal layer to protect it from oxidization during the subsequent deposition of the first dielectric layer.

The optical filter is optionally heat treated to adjust the transmission characteristic of the optical filter. Heat treating in air at temperatures around or above 200° C. can improve the amount of visible light transmitted through optical filters according to embodiments of the present invention. An AR filter is optionally deposited over the last layer in the optical filter, and/or on the opposite surface of the optical substrate.

The invention has been described above in reference to specific embodiments. Alterations, modifications, and improvements may occur to those skilled in the art. Such alterations, modifications, and improvements are intended to be within the spirit and scope of the invention. Accordingly, the foregoing description is by way of example only, and is not intended as limiting. The invention is limited only by the following claims and equivalents thereto.

What is claimed is:

1. An infrared filter comprising: a substrate; and
   an optical filter stack disposed on a first surface of the substrate, the optical filter stack including
   a plurality of dielectric layers, and
   a plurality of metal layers alternating with the dielectric layers,
   wherein the plurality of metal layers comprises at least four metal layers,
   wherein the infrared filter obtains an average transmission greater than or equal to 75% between 400 nm and 600 nm, and
   wherein the dielectric layers comprise $Nb_2O_5$ and the metal layers comprise silver.

2. The infrared filter of claim 1 further comprising a plurality of corrosion suppression layers disposed between the dielectric layers and the metal layers.

3. The infrared filter of claim 2 wherein the metal layers comprise a first metal having a first galvanic potential and the corrosion suppression layers include a second metal having a second galvanic potential, the second galvanic potential being greater than the first galvanic potential.

4. The infrared filter of claim 1 wherein the average transmission is not less than 80% between 400 nm and 600 nm.

5. The infrared filter of claim 1 further comprising a plurality of ZnO layers, each ZnO layer in the plurality disposed between a dielectric layer and a metal layer.

6. The infrared filter of claim 5 wherein each of the plurality of ZnO layers is about 1–10 nm thick.

7. The infrared filter of claim 1 comprising a transmission-enhancing coating disposed on a second surface of the substrate, wherein the transmission-enhancing coating is an anti-reflective coating.

8. The infrared filter of claim 1 further comprising a transmission-enhancing coating and a blur filter, the blur filter disposed between the transmission-enhancing coating and a second surface of the substrate.

9. The infrared filter of claim 1 wherein the substrate comprises a birefringent material.

10. The infrared filter of claim 1 wherein the infrared filter comprises a lid to a photodetector assembly, a photodetector array being disposed inside a package of the photodetector assembly.

11. An infrared filter as defined in claim 1, wherein a first corrosion-suppressing layer separates one of the dielectric layers from a metal layer, and wherein a second corrosion-suppressing layer separates another of the dielectric layers from said metal layer.

12. An infrared filter comprising:
a substrate; and
an optical filter stack disposed on a first surface of the substrate, the optical filter stack including
a plurality of dielectric layers,
a plurality of metal layers alternating with the dielectric layers, and
a plurality of corrosion suppression layers, the plurality of corrosion suppression layers including a first corrosion-suppressing layer separating one of the dielectric layers in the plurality of dielectric layers from a metal layer in the plurality of metal layers, and a second corrosion-suppressing layer separating another of the dielectric layers in the plurality of dielectric layers from said metal layer,
wherein the plurality of metal layers comprises at least four metal layers,
wherein the infrared filter obtains an average transmission greater than or equal to 75% between 400 nm and 600 nm, and
wherein the optical filter stack includes a stack of the form D1/C1/M1/C2/D2, wherein D1 is a first dielectric layer, C1 is the first corrosion-suppressing layer, M1 is said metal layer, C2 is the second corrosion-suppressing layer, D2 is a second dielectric layer.

13. The infrared filter of claim 12 wherein the dielectric layers comprise $Nb_2O_5$.

14. The infrared filter of claim 12 wherein the metal layers comprise silver.

15. The infrared filter of claim 12 wherein the first corrosion-suppressing layer and the second corrosion-suppressing layer comprise a metal oxide.

16. The infrared filter of claim 15 wherein the metal oxide is zinc oxide.

17. The infrared filter of claim 16 wherein each of the plurality of ZnO layers is about 1–10 nm thick.

18. The infrared filter of claim 15 wherein the first corrosion-suppressing layer is less than about 10 nm thick.

19. The infrared filter of claim 12 wherein the metal layer is a silver or silver alloy layer.

20. The infrared filter of claim 12 wherein the metal layer is less than 25 nm thick.

21. The infrared filter of claim 12 wherein the second corrosion-suppressing layer includes a metal portion on the metal layer M1, and a metaloxide portion on the metal portion of the second corrosion-suppressing layer.

22. The infrared filter of claim 12, wherein the infrared filter has been thermally treated at a temperature above 200C.

23. The infrared filter of claim 12, wherein the infrared filter has a low wavelength shift with changes in angle of incidence.

* * * * *